United States Patent [19]
Golden

[11] 3,867,638
[45] Feb. 18, 1975

[54] RADIATION BEAM CONSTANCY CHECK BLOCK

[76] Inventor: Robert Golden, Youngstown, Ohio

[22] Filed: Nov. 13, 1972

[21] Appl. No.: 306,357

[52] U.S. Cl................. 250/505, 250/252, 250/374, 250/521
[51] Int. Cl............................................. G01t 1/16
[58] Field of Search .......... 250/252, 390, 490, 491, 250/492, 521, 304, 395, 439, 444, 505, 510, 312, 476, 482, 503, 374; 249/175, 177; 161/109; 156/64

[56] References Cited
UNITED STATES PATENTS

| | | | |
|---|---|---|---|
| 2,620,445 | 12/1952 | Tyler................................... | 250/439 |
| 2,719,823 | 10/1955 | Zinn.................................... | 250/390 |
| 2,927,209 | 3/1960 | Jones et al........................... | 250/304 |
| 3,524,063 | 8/1970 | Mangan........................... | 250/252 X |

Primary Examiner—James W. Lawrence
Assistant Examiner—Davis L. Willis
Attorney, Agent, or Firm—Webster B. Harpman

[57] ABSTRACT

A check block for determining radiation beam constancy provides a predetermined mass having a cavity in which an ionization chamber with or without a void filling sleeve may be positioned in predetermined spaced relation to targets on the block. Periodic inspection of the block and the ionization chamber therein readily enables the constancy of the absorbed dose and energy of the radiation beam to be determined.

4 Claims, 3 Drawing Figures

PATENTED FEB 18 1975   3,867,638

3,867,638

RADIATION BEAM CONSTANCY CHECK BLOCK

BACKGROUND OF THE INVENTION

1. Field of the Invention

This invention relates to a device for periodically measuring the constancy of a radiation beam to indicate whether or not the measured radiation and energy remains constant or whether trends in the machine-detector system occur, or whether measured ionization remains constant.

2. Description of the Prior Art

Prior art structures insofar known have related to devices by which an X-ray dose can be measured as in U.S. Pat. No. 1,990,022 and structures by which the penetration of an X-ray can be measured as in U.S. Pat. No. 1,531,620. Somewhat similar devices have been employed in the spectrometric examination of specimens as set forth in U.S. Pat. No. 2,927,209. The present invention enables the user to obtain radiation measurements in a constant geometry with a particular therapy machine and radiation detector which measurements are not possible with the devices of the prior art.

SUMMARY OF THE INVENTION

A beam constancy check block preferably in the form of a square cube of a synthetic resin having known radiation beam transmission properties provided with target areas on opposed surfaces and a tubular cavity therebetween and inwardly from one side thereof for the reception of ionization chambers in which the material subjected to a radiation beam is positioned. Sleeves having an internal configuration matching that of the ionization chamber employed fill out the voids between the ionization chamber and tubular cavity, the sleeves being formed of the same synthetic resin as the check block.

Initially base line data should be obtained in a large volume of water and then in the constancy check block when the calibration and effective energy of the machine being tested are known to be correct. Periodic measurements in the check block over long intervals of time utilizing exactly the same measurement parameters and techniques will reliably indicate whether measured radiation remains constant or whether trends in the machine-detector system occur.

DESCRIPTION OF THE PREFERRED EMBODIMENT

Figure 1:
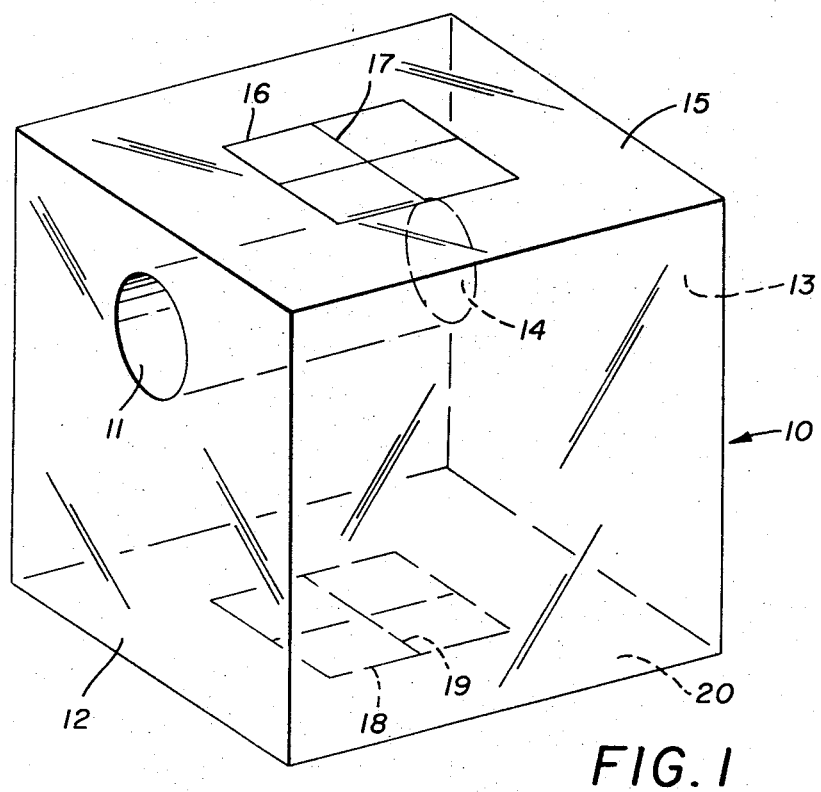
FIG. 1 is a perspective view of the beam constancy check block.

The beam constancy check block as shown herein and described takes the form of a 6 inch square block 10 of a suitable synthetic resin such as Plexiglas or polystyrene having a known physical density and capable of attenuating X-rays and electrons with predictable changes in tranmission, scattering, and radiation energy thereof. A tubular cavity 11 is formed inwardly of the block 10 in a side 12 thereof and terminates short of the opposite side 13 thereof, the inner end of the tubular cavity 11 being indicated by the numeral 14. The top 15 of the block 10 has a target square 16 with right angular cross lines 17 thereon formed in the surface thereof and a duplicate target square 18 with cross lines 19 is formed in the opposite or bottom surface 20 of the block 10 and in vertical alignment with the target square 16 and cross lines 17 in the top 15.

The tubular cavity 11 is so located that a center line extended between the cross points of the cross lines 17 and 19 will pass exactly through the inner axial center line of the tubular cavity 11, which is unequally distant from the top 15 and bottom surface 20 of the block 10. Those skilled in the art will observe that ionization chambers for subjection to the radiation or X-ray beam being tested exist and one such ionization chamber may be seen in perspective in FIG. 3 of the drawings wherein the ionization chamber may have an enlarged left end portion 21 and an intermediate section of reduced diameter 22 and a hollow air filled chamber 23 in which ionization takes place.

Figure 2:
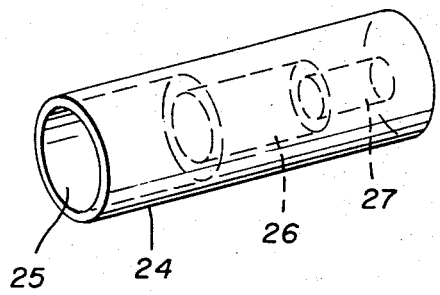
FIG. 2 is a perspective view of a sleeve having a cavity of predetermined configuration therein and, FIG. 3 is a perspective view of an ionization chamber for use in the sleeve of FIG. 2.

In FIG. 2 of the drawings, a sleeve 24 is illustrated which consists of a tubular member having a uniform exterior diameter and an interior configuration matching the exterior configuration of the ionization chamber and the area of enlarged diameter 21 thereof which is matched by an enlarged cavity 25 in the sleeve 24, an intermediate cavity 26 which conforms with the diameter of the intermediate section 22 of the ionization chamber and a smaller diameter cavity therewith and indicated by the numeral 27 which corresponds with the diameter of the air filled hollow portion 23 of the ionization chamber as hereinbefore described.

Figure 3:
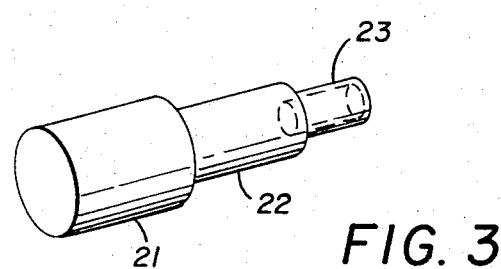

The ionization chamber of FIG. 3 can therefore be positioned in the sleeve 24 and the sleeve 24 in turn positioned in the tubular cavity 11 of the block 10 with the air filled hollow end portion 23 in vertical alignment with the cross lines 17 and 19 of the targets 16 and 18, and at depths from surface 15 at, or greater than depths required for the maximum dose appropriate to the various X-ray energies utilized.

Those skilled in the art will observe that ionization chambers are available in configurations other than that illustrated in FIG. 3 of the drawings and heretofore described and it will be obvious that the internal configuration of the sleeve 24 can be varied to match the external configurations of the various ionization chambers that may be desirably used in the beam constancy check block of the invention.

In operation the ionization chamber is inserted in the suitably shaped sleeve 24 and the sleeve 24 in turn positioned in the tubular cavity 11 in the test block with the air filled hollow end portion 23 in line with the cross lines 17 and 19 of the targets thereon. The X-ray machine or radiation device is then actuated to expose the ionization chamber and the air therein, which is withdrawn after exposure and read out on the usual Rotengen meter. A second set of readings are next obtained with the top and bottom surfaces of the block reversed relative to the direction of the radiation beam. The known depth and transmission qualities of the check block are reflected in the read out and periodic repetition of the test and comparison of the results enable the constancy of the X-ray machine or radiation device performance to be determined. The ratio of the two sets of pressure-temperature corrected readings is unique for the beam energy and block. A change in the ratio will indicate a change in radiation beam energy or in response of the radiation detector; the ionization chamber.

Those skilled in the art will observe that the presence of the target squares 16 and 18 and their cross lines 17 and 19 enable the radiation device or X-ray beam and more particularly the light beam for visual indication as normally provided to coincide with the outlined field and the alignment thereof with the cross lines of the targets. A consistent series of readings may be readily obtained by taking a first set with the block in position as shown in FIG. 1 of the drawings and a second set by reversing the block and placing the bottom 20 in uppermost position. The formation of a permanent record of such readings as hereinbefore described provide effective beam constancy observation which enables the operator of the X-ray or radiation equipment to properly determine dosimetric quantities based on a known beam constancy and energy.

Although but one embodiment of the present invention has been illustrated and described it will be apparent to those skilled in the art that various changes and modifications may be made therein without departing from the spirit of the invention.

I claim:

1. The combination of an X-ray beam constancy check block and an ionization test chamber, said block comprising a unitary body formed from a single piece of synthetic resin and having a known radiation transparency, said body having at least two parallel spaced surfaces and a third surface perpendicular thereto, said body being provided with a tubular cavity extending inwardly from said perpendicular surface and parallel with said parallel surfaces for removably receiving said ionization test chamber, said tubular cavity being unequally distant from said spaced parallel surfaces of said body, target indicia on said spaced parallel surfaces on a common center line extending through said tubular cavity.

2. The combination of claim 1 and wherein a tubular sleeve of a diameter closely fitting within that of the tubular cavity is normally positioned therein and adapted to removably receive said ionization test chamber.

3. The combination of claim 1 and wherein the tubular sleeve has an inner configuration of different diameters.

4. The combination of claim 1 wherein said ionization test chamber is a hollow air filled chamber positioned in said tubular cavity on said common center line.

* * * * *